United States Patent
Okada

(10) Patent No.: US 9,759,875 B2
(45) Date of Patent: Sep. 12, 2017

(54) OPTICAL MODULE HAVING OPTICAL UNIT ENCLOSING SEMICONDUCTOR OPTICAL DEVICE LEVELED TO SURFACE FIXING OPTICAL UNIT

(71) Applicant: Sumitomo Electric Device Innovations, Inc., Yokohama-shi (JP)

(72) Inventor: Takeshi Okada, Yokohama (JP)

(73) Assignee: Sumitomo Electric Device Innovations, Inc., Yokohama-shi (JP)

(*) Notice: Subject to any disclaimer, the term of this patent is extended or adjusted under 35 U.S.C. 154(b) by 0 days.

(21) Appl. No.: 15/062,997

(22) Filed: Mar. 7, 2016

(65) Prior Publication Data

US 2016/0266318 A1 Sep. 15, 2016

(30) Foreign Application Priority Data

Mar. 9, 2015 (JP) ................................. 2015-045893

(51) Int. Cl.
*G02B 6/36* (2006.01)
*G02B 6/42* (2006.01)

(52) U.S. Cl.
CPC .......... *G02B 6/4246* (2013.01); *G02B 6/4215* (2013.01); *G02B 6/4237* (2013.01); *G02B 6/4244* (2013.01)

(58) Field of Classification Search
USPC .................................................... 385/33, 88
See application file for complete search history.

(56) References Cited

U.S. PATENT DOCUMENTS

| 2005/0185899 | A1* | 8/2005 | Lo | .......... G02B 6/4201 385/92 |
| 2010/0086262 | A1* | 4/2010 | Kihara | ................. G02B 6/4214 385/89 |
| 2013/0294726 | A1* | 11/2013 | Okada | .................. G02B 6/4206 385/33 |

FOREIGN PATENT DOCUMENTS

JP 2006-351608 A 12/2006

* cited by examiner

*Primary Examiner* — Eric Wong
(74) *Attorney, Agent, or Firm* — Venable LLP; Michael A. Sartori; Laura G. Remus

(57) ABSTRACT

A bi-directional optical module that provides an Rx unit and a Tx unit, where optical axes are perpendicular to each other, is disclosed. The optical module provides a housing that installs a WDM filter therein and assembles the coupling unit in a surface through the front alignment unit, the Tx unit in another surface opposite to the former surface, and the Rx unit in still another surface connecting the former two surfaces through the rear alignment unit. The axes of the Tx unit and the coupling unit are in parallel to each other, but the axis of the Rx unit is in perpendicular to the former two axes. The Rx unit installs a photodiode (PD) with an optically sensitive surface leveled with the surface of the rear alignment unit to which the Rx unit is attached.

12 Claims, 7 Drawing Sheets

OPTICAL MODULE HAVING OPTICAL UNIT ENCLOSING SEMICONDUCTOR OPTICAL DEVICE LEVELED TO SURFACE FIXING OPTICAL UNIT

BACKGROUND OF THE INVENTION

1. Field of the Invention

The present application relates to an optical module, in particular, the present application relates to an optical module having an optical unit that encloses a semiconductor optical device with a sensitive surface whose level is aligned with an end surface of a housing to which the optical unit is fixed.

2. Background Arts

A wavelength division multiplexing (WDM) and/or a bi-directional communication using two wavelengths for a single optical fiber have been become popular by utilizing the orthogonality with respect to the wavelength. Also, the communication speed, or the communication capacity of such a system reaches and sometimes exceeds 10 Gbps. A light-receiving device, typically, a semiconductor photodiode (PD) and an avalanche photodiode (APD), is strongly requested to decrease parasitic capacitance including junction capacitance thereof. Accordingly, an optically sensitive area of such a PD has become narrower, where a diameter of the optically sensitive area is, for example, 30 μm or shorter to reduce the junction capacitance. The assembly of the optical module implementing such PD with a narrowed sensitive area has become critical because of a limited positional tolerance in the optical alignment thereof.

SUMMARY OF THE INVENTION

An aspect of the present application relates to an optical module that includes an optical unit and a primary assembly. The optical unit may be a receiver optical unit and/or transmitter optical unit, where the optical unit encloses a semiconductor optical device. The semiconductor optical device of the invention converts one of an optical signal and an electrical signal into another of the optical signal and the electrical signal, and has an optically sensitive surface. The primary assembly has an end surface to which the optical unit is fixed. A feature of the optical module of the present invention is that the optically sensitive surface of the semiconductor optical device in a level thereof is aligned to the end surface of the primary subassembly. In other words, the optically sensitive surface of the semiconductor optical device is within a virtual plane extending from the end surface of the primary assembly to which the optical unit is fixed.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments according to the present invention will be described as referring to drawings. In the explanation of the drawings, numerals or symbols same with or similar to each other will refer to elements same with or similar to each other without duplicated explanations.

A convention optical module applicable to the high speed optical communication will be first explained. A process to assembly a receiver optical unit that implements a photodiode (PD) with a restricted sensitive area requests an optical alignment and a fixation with extremely preciseness. The YAG laser welding and/or an adhesive resin are widely used for the permanent fixation of optical components once optically aligned with extremely preciseness. But, the former fixation inevitably accompanies with misalignment at the welding and the latter fixation accompanies with shrinkage at the solidification, both of which causes the misalignment of the optical components.

Figure 7A:
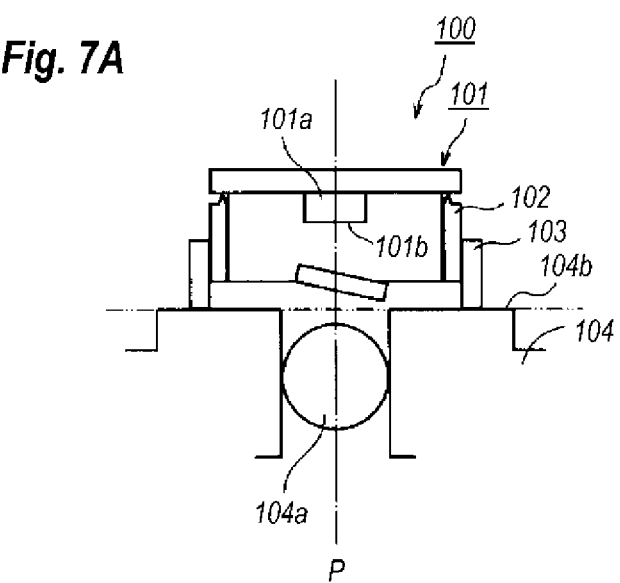
FIGS. 7A and 7B show cross sections of a conventional optical receiver module with mechanisms of the present invention.
Figure 7B:
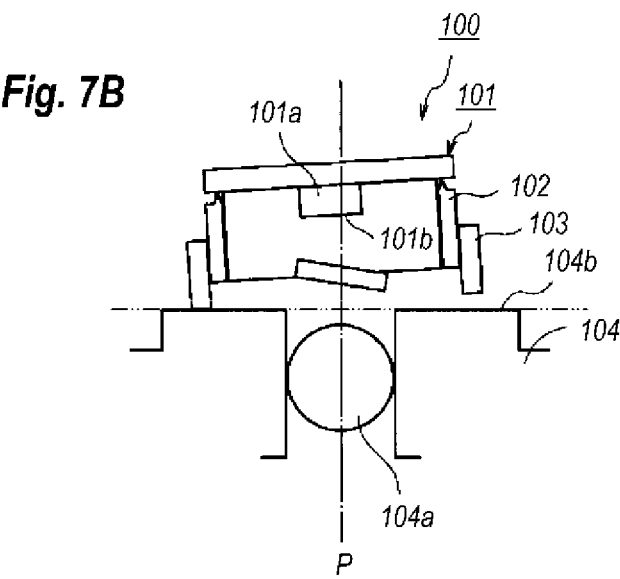

FIGS. 7A and 7B schematically show an optical module before and after assembling components, respectively. The optical module 100 shown in FIGS. 7A and 7B is the type of a bi-directional optical module including a receiver optical unit 101, a transmitter optical unit and a coupling unit, where the latter two units are omitted in FIGS. 7A and 7B. The optical module further is fixed to a lens holder 104 that secures a lens 104a therein, to which the optical receiver unit 101 is fixed. The optical module 100 aligns, along the optical axis P thereof, the optical receiver unit 101, which is held by a holder ring 102, with the J-sleeve 103 by sliding the holder ring within a bore of the J-sleeve 103. Then, the J-sleeve 103 is welded to the holder ring 102. Also, the optical receiver unit 100 is aligned in directions perpendicular to the optical axis P by sliding the J-sleeve 103 on an end surface 104b of the lens holder 104, then fixed thereto by fillet welding. Thus, the optical receiver unit 101 is fixed to the lens holder 104 after the precise alignment in three directions.

However, the conventional arrangements in the optical module 100 shown in FIG. 7A, the optically sensitive surface 101b of the optical device 101a is possibly inclined with the optical axis P after the fixation of the optical receiver unit 101 to the lens holder 104 by the welding, even when the optical alignment therebetween described above is once performed precisely, as shown in FIG. 7B.

Figure 1:
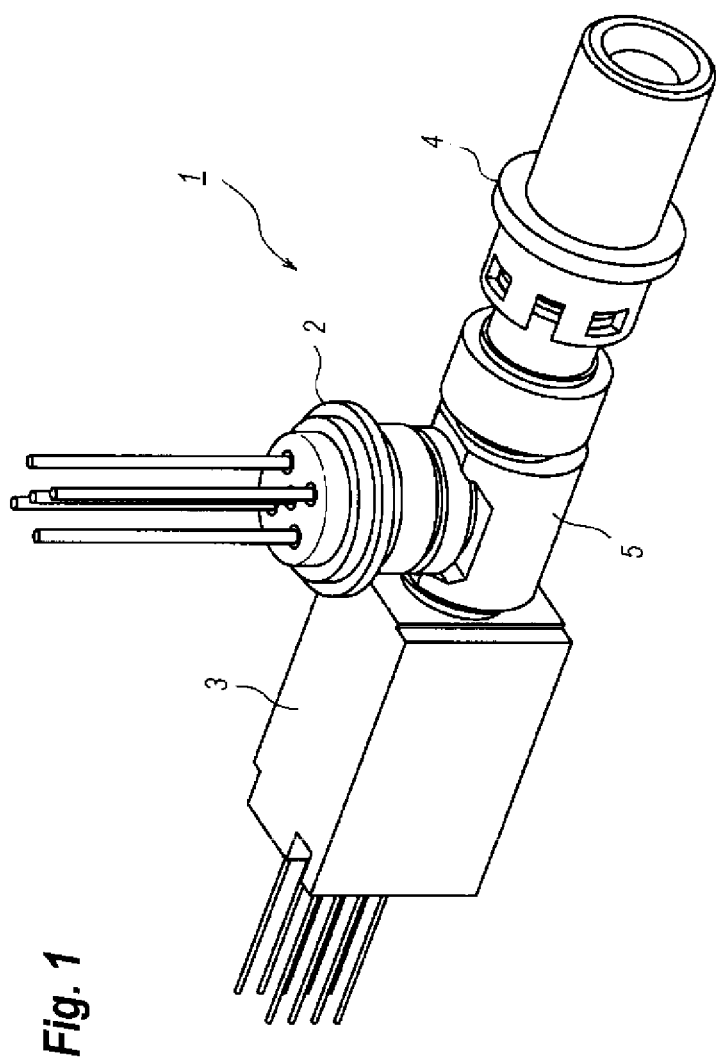
FIG. 1 is a perspective view showing a bi-directional optical module according to an embodiment of the present invention.
Figure 2:
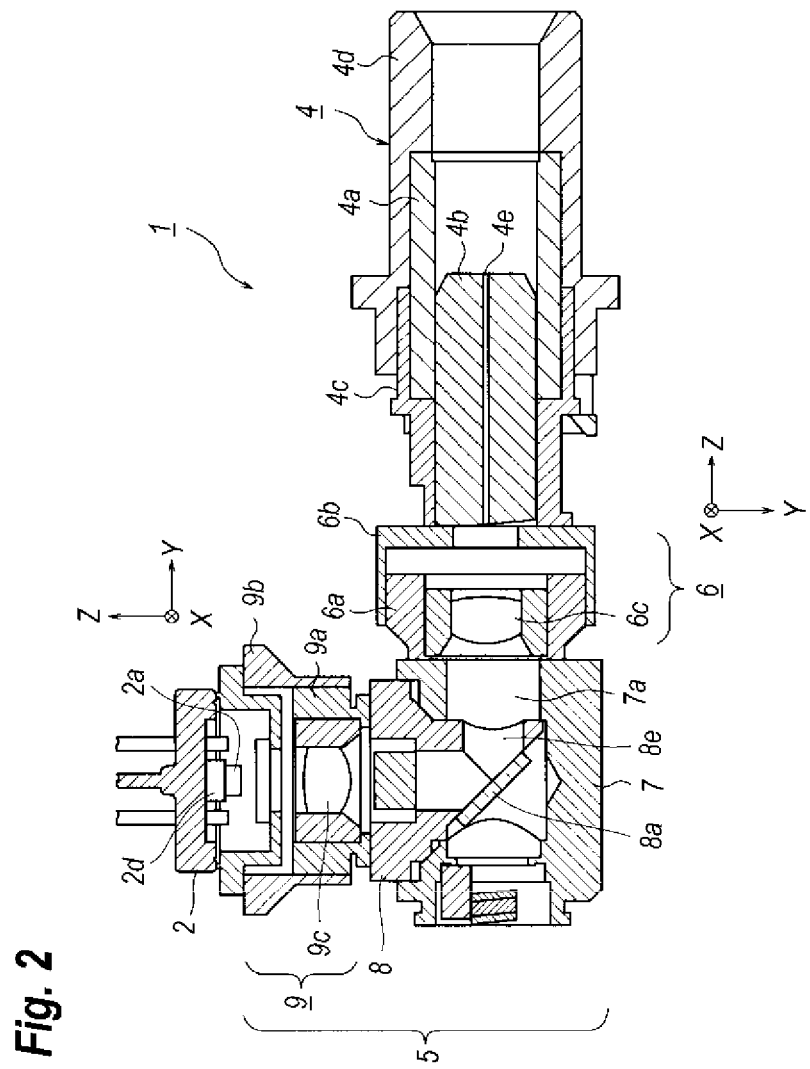
FIG. 2 shows a cross section of the bi-directional optical module shown in FIG. 1.
Figure 3:
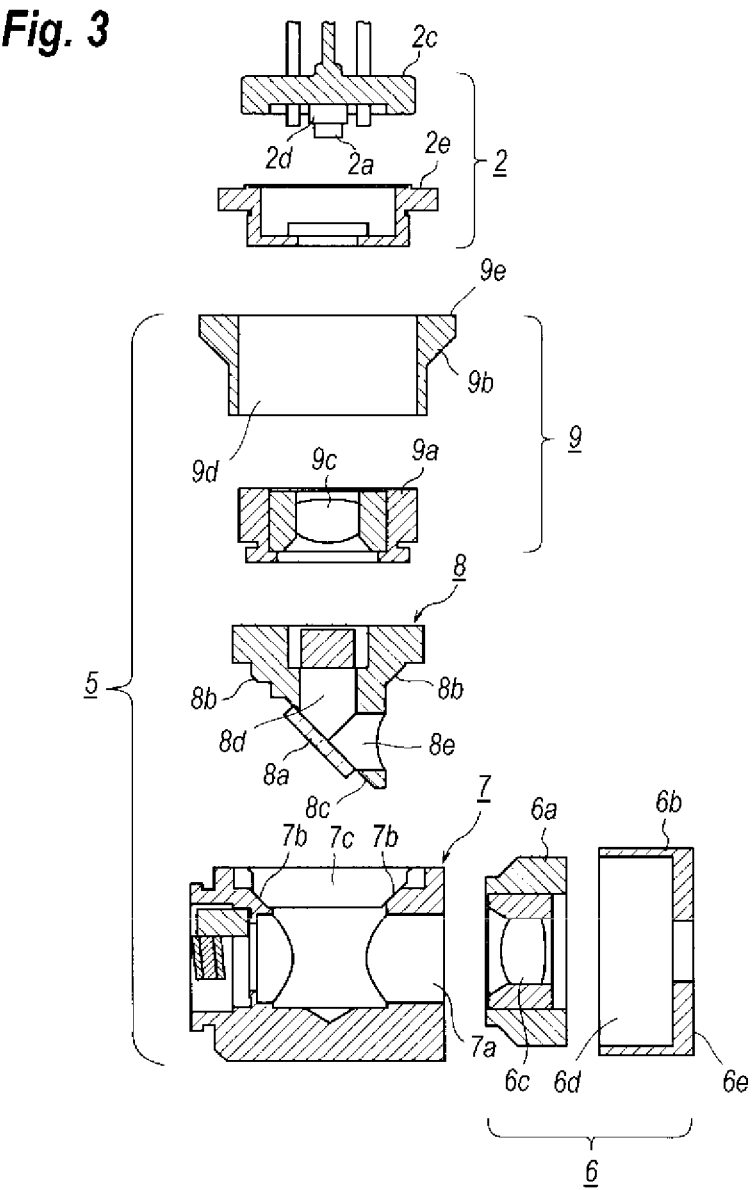
FIG. 3 is an exploded cross section of respective parts in the bi-directional optical module shown in FIG. 1.

FIG. 1 is a perspective view showing a bi-directional optical module according to an embodiment of the present invention; FIG. 2 shows a cross section of the bi-directional optical module shown in FIG. 1; and FIG. 3 is an exploded cross section of respective parts in the bi-directional optical module shown in FIG. 1. The optical module shown in FIG. 1 is a type of a bi-directional optical module capable of transmitting an optical signal (Tx signal) with a wavelength and concurrently receiving another optical signal (Rx signal)

with another wavelength but for a single external fiber. The optical module 1 includes a receiver optical unit (Rx unit) 2, a transmitter optical unit (Tx unit) 3, and a coupling unit 4 that receives an external optical connector securing the single optical fiber. The wavelengths of the Tx signal and the Rx signal are different from each other. The optical module 1 further provides a primary assembly 5 to which the Rx unit 2, the Tx unit 3, and the coupling unit 4 are fixed thereto.

The Rx unit 2 implements a photodiode (PD) 2a that receives the Rx signal, and fixed to the primary assembly 5 such that an optical axis thereof, or the optical axis of the PD 2a, makes a right angle against an optical axis of the coupling unit 4. The Tx unit 3 implements a laser diode (LD) that emits the Tx signal toward the coupling unit 4, and fixed to the primary assembly 5 such that an optical axis thereof, or the optical axis of the LD, is in parallel to the optical axis of the coupling unit 4. In an embodiment shown in FIG. 1, the Tx unit 3 has a box-shaped package, which is often called as a butterfly package, but the optical module 1 may implement the Tx unit 3 with a co-axial package same with those of the Rx unit 2.

The primary assembly 5, as illustrated in FIG. 2, includes a front alignment unit 6 having a front lens holder 6a that secures a front lens 6c, and the front J-sleeve 6b; a rear alignment unit 9 including a rear lens holder 9a that secures a rear lens 9c, and a rear J-sleeve 9b; a filter holder 8 including a wavelength division multiplexing (WDM) filter 8a, and a housing 7. The housing 7 receives the filter holder 8 and secures the coupling unit 4 and the Rx unit 2 through the front alignment unit 6 and the rear alignment unit 9, respectively. In the description below, a direction "front" or "forward" corresponds to the side where the coupling unit 4 is provided, while, another direction "rear" corresponds to a side where the Rx unit 2 is provided. However, those descriptions are defined merely from an explanation sake, and do not narrower the scope of the invention at all. The coupling unit 4 is, as illustrated in FIG. 2, is fixed to the primary assembly 5 through the front alignment unit 6 as optically aligning with respect to directions in parallel and in perpendicular to the optical axis of the coupling unit 4. Details of the coupling unit 4 and the front alignment unit 6 will be described later. The front lens 6c collimates the Rx signal provided from the single optical fiber through the coupling unit 4; but concentrates the Tx signal provided from the Tx unit 3 onto an end of the coupling unit 4.

In addition to the front alignment unit 6, as illustrated in FIGS. 1 and 3, the primary assembly 5 provides a cylindrical housing 7, a filter holder 8 that secures a WDM filter 8a, a rear alignment unit 9 including the rear lens holder 9a that secures a rear lens 9c, and a arear J-sleeve 9b that connects the Rx unit 2 to the rear lens holder 9a. The Rx unit 2 is aligned with respect to the housing 7 by a combination of the rear lens holder 9a and the rear J-sleeve 9b, and fixed thereto. The rear lens holder 9a is preferably a type of an aspheric lens because a spherical lens inherently shows a substantial aberration and is unable to concentrate an optical beam into a restricted area of a PD 2a that often has a sensitive area smaller than 20 μm in a diameter thereof.

The optical module 1 thus described optically couples the Tx signal emitted from the Tx unit 3 with a coupling fiber 4e secured in the coupling unit 4 through the WDM filter 8a and the front lens 6c; while, the Rx signal provided from the coupling fiber 4e to the Rx unit 2 through the front lens 6c, reflected by the WDM filter 8a, and concentrated by the rear lens 9c on the Rx unit 2. Because the Rx unit 2 is fixed to a side of the housing 7, that is, the optical axis of the coupling unit 4 is perpendicular to the optical axis of the Rx unit 2; the Rx unit 2, exactly, the optically sensitive surface of the PD 2a is possibly inclined with respect to the optical axis of the coupling unit 4 after the fixation to the housing 7. In other words, the optically sensitive surface of the PD 2a becomes nonparallel to an end surface of the primary assembly 5 to which the Rx unit 2 is fixed.

Figure 4:
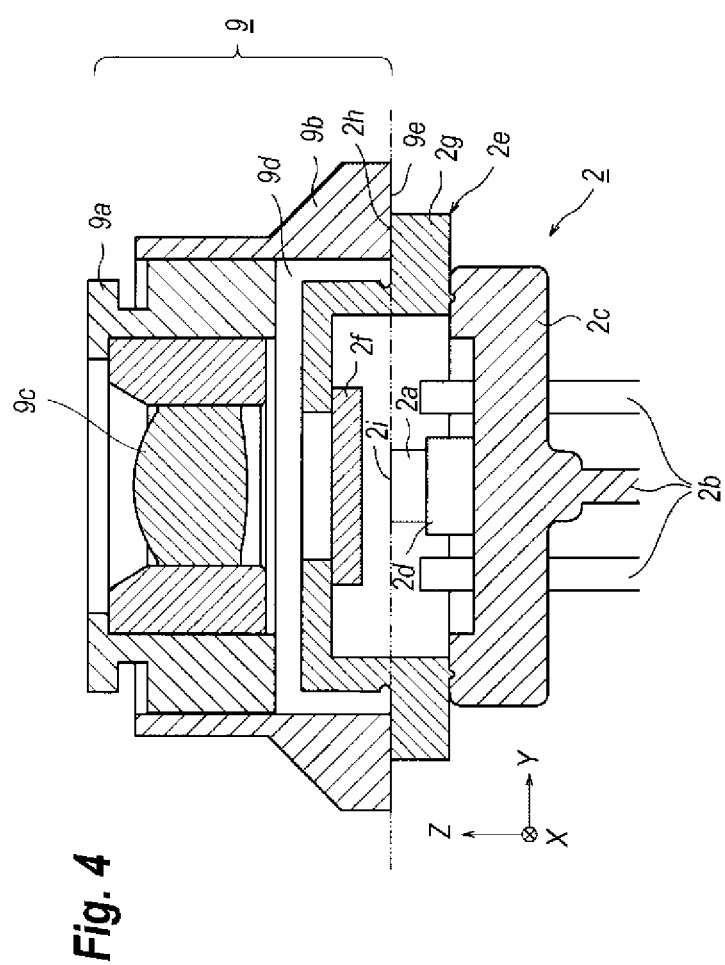
FIG. 4 is a cross section showing an optical receiver unit, a second lens holder, and a second J-sleeve assembled by welding to each other.
Figure 5A:
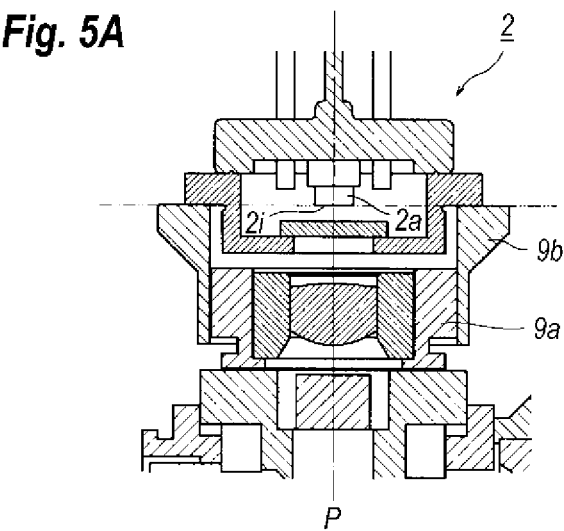
FIG. 5A shows a cross section of the optical receiver unit before being assembled with the other members.
Figure 5B:
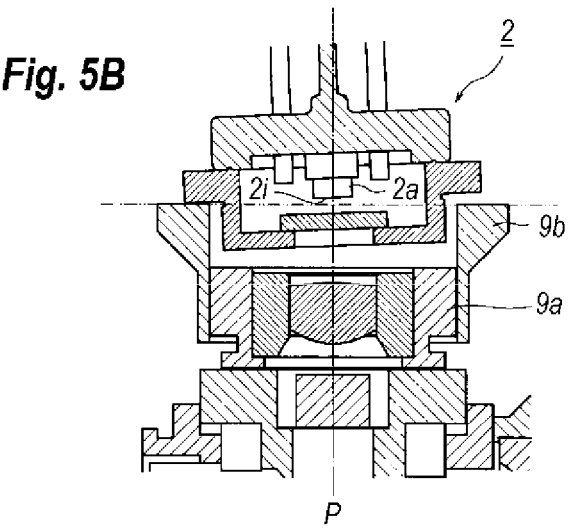
FIG. 5B shows another cross section of the optical receiver unit after being assembled with the other members.

FIG. 4 is a cross section of the Rx unit 2, the rear J-sleeve 9b, and the rear lens holder 9a to which the Rx unit 2 is fixed. FIG. 5A shows a cross section of the Rx unit 2 before being fixed to the primary assembly 5 and FIG. 5B shows a cross section of the Rx unit 2 after the fixation to the primary assembly 5.

The Rx unit 4, as illustrated in FIG. 4, includes in addition to the PD 2a, a stem 2c through which lead pins 2b pierce. The PD 2a is mounded on the stem 2c through a sub-mount 2d. The lead pins 2b provide biases to the PD 2a and extract electrical signals corresponding to the Rx signal therethrough. The cap 2e, which has a flange 2g forms a space into which the PD 2a and the sub-mount 2d are enclosed. The cap 2e also provides a window 2f for sealing the space air-tightly, through which the Rx signal enters the PD 2a. The sub-mount 2d may be made of aluminum nitride (AlN), and the cap 2e, which may be made of alloy of nickel (Ni), cobalt (Co), and iron (Fe), often called as Kovar™, provides a window 2f made of material transparent for light subject to the Rx unit 2.

The rear J-sleeve 9b, which has a cylindrical shape with a bore 9d, receives the rear lens holder 9a from one of ends of the boar 9d and the Rx unit 2 from the other end of the bore 9d. The pierce welding fixes the rear lens holder 9a to the rear J-sleeve 9b; accordingly, a wall of the rear J-sleeve 9b is formed thin. The Rx unit 2 is fixed in an end surface 9e of the rear J-sleeve 9b. Specifically, a surface 2h of the flange 2g of the cap 2e is fixed to the end surface 9e of the rear J-sleeve 9b by the fillet welding.

The optical alignment between the Rx unit 2 and the primary assembly 5 along the optical axis of the Rx unit 2 may be carried out by procedures same with those between the primary assembly 5 and the coupling unit 4 through the front alignment unit 6. That is, the optical alignment between the Rx unit 2 and the primary assembly 5 along the optical axis may be carried out by adjusting an overlapped length between the rear J-sleeve 9b and the rear lens holder 9a; while, the optical alignment between the Rx unit 2 and the primary assembly 5 within a plane perpendicular to the optical axis of the Rx unit 2 may be performed by sliding the Rx unit 2 on the end surface 9e of the rear J-sleeve 9b within a gap formed between the outer surface of the cap 2 and the inner surface of the bore 9d of the rear J-sleeve 9b.

A feature of the optical module 1 of the present embodiment is that the surface 2h of the flange 2g of the cap 2e in a level thereof is aligned with the optically sensitive surface 2i of the PD 2a. That is, the optical sensitive surface 2i of the PD 2a and the surface 2h facing the rear lens holder 10 are positioned within a same plane. As a result, as shown in FIGS. 5A and 5B, even when the fillet welding between the cap 2e and the rear lens holder 10 makes the optical axis of the Rx unit 2, namely, the optical axis of the optically sensitive surface 2i of the PD 2a inclined with respect to the optical axis P of the rear J-sleeve 9b, the misalignment of the optically sensitive surface 2i of the PD 2a may be effectively restricted, which means that even when the optically sensitive surface 2i of the PD 2a is formed relatively narrower to reduce the junction capacitance thereof, the optical alignment between the PD 2a and the rear J-sleeve 9b may be realized.

Figure 6:
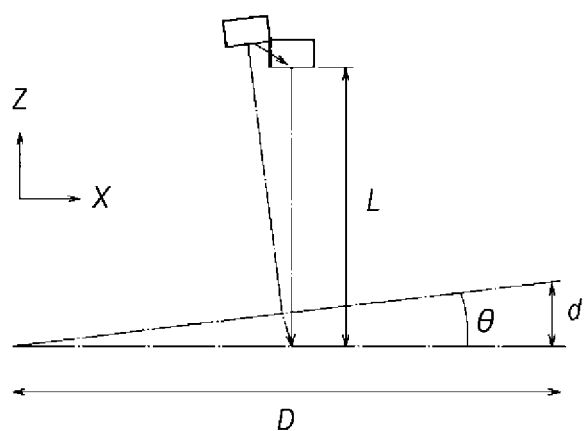
FIG. 6 explains a mechanism to align the optical receiver module according to the present invention.

FIG. 6 explains a mechanism to align the optical receiver module according to the present invention. Assuming parameters L, d, and D are a distance between the surface 2h of the flange 2g to the optically sensitive surface 2i of the PD 2a, increment or decrement of the distance above after the welding, and an outer diameter of the flange 2g, respectively, the inclined angle θ and deviations (dx, dz) are denoted by:

$$\theta = \tan^{-1}(d/D),$$

$$dx = D/2 * (1 - \cos\theta) + L * \sin\theta,$$

$$dz = D/2 * \sin\theta + L * (1 - \cos\theta).$$

Because the increment/decrement d is generally far less than the outer dimension D of the flange 2g, d<<D; we may regard as sin θ~θ and cos θ~1. Accordingly, the deviation is given by:

$$(dx, dz) = (L \times \theta, D/2 \times \theta).$$

Thus, the physical arrangement between the optically sensitive surface 2i of the PD 2a and the surface 2h of the flange 2g to be welded to the rear J-sleeve 9b may effectively restrict the positional deviation of the optically sensitive surface 2i of the PD with respect to the rear J-sleeve 9b. In other words, the positional relation of the optically sensitive surface 2i of the PD 2a and the surface 2h of the flange 2g is insensitive to the misalignment due to the welding.

The arrangement of the Rx unit 2 and the rear J-sleeve may have preferable relations of an outer diameter of the stem 2c is smaller than that of the cap 2g, and the output diameter of the cap 2g is smaller than that of the rear J-sleeve 9b; because those relations of the outer diameters may enhance the productivity of the Rx unit 2 and the rear J-sleeve 9b. When the outer diameter of the flange 2g is smaller than those of other two diameters, the fillet welding between the members considerably becomes hard. The rear J-sleeve 9b and/or the stem 2c would block the laser beam for the welding.

Specifically, the flange 2g preferably has a thickness greater than 0.3 mm. A flange with an ordinary thickness of about 0.2 mm would be easily deformed by the resistance welding between the cap and the stem, which means that a distance between the surface 2h of the flange 2g and the optically sensitive surface 2i of the PD 2a also varies. Also, the flange 2g preferably has a width at least 0.5 mm for securing the alignment tolerance for the rear J-sleeve 9b and the fillet welding.

Next, details of the coupling unit 4 and the primary assembly 5 will be described as referring back to FIGS. 2 and 3. The coupling unit 4 includes a sleeve 4a, a stub 4b, a bush 4c, and a sleeve cover 4d. The sleeve 4a receives an optical ferrule secured in end of the single optical fiber. The stub 4b in a front half thereof is held by a rear portion of the sleeve 4a. The bush 4c in a rear portion thereof supports the rear portion of the stub 4b, while, the front portion of the bush 4c is inserted between the sleeve cover 4d and the rear portion of the sleeve 4a; that is, the rear portion of the sleeve 4a is inserted between the front portion of the bush 4c and the front portion of the stub 4b. The insertion of the rear portion of the sleeve 4a, that of the front portion of the bush 4c may be carried out by press-fitting.

The stub 4b secures the coupling fiber 4e in a center thereof. The optical ferrule of the external fiber may be physically in contact to a tip of the coupling fiber 4e, which realizes the physical contact (PC) therebetween, and the external fiber may optically couple with the coupling fiber 4e without causing Fresnel interfaces. The Rx unit 2 and the Tx unit 3 may optically couple with the rear end of the coupling fiber 4e. In other words, the rear alignment unit 9, the WDM filter 8a, and the front alignment unit 6 may optically couple the Rx unit 2 with the rear end of the coupling fiber 4e. The arrangement between the Tx unit 3 and the coupling unit 4 may also optically couple the Tx unit 3 with the rear end of the coupling fiber 2e. Thus, the PD 2a in the Rx unit 2 and the LD in the Tx unit 3 may optically couple with the external fiber. The rear end surface of the stub 4b is inclined to the optical axis of the coupling fiber 4e, which effectively prevent the Tx signal output from the Tx unit 3 from returning the Tx unit 3.

The coupling unit 4 is fixed to the primary assembly 5 through the front alignment unit 6. The front J-sleeve 6b receives the front lens holder 6a in a bore 6d thereof. The front lens holder 6a secures the front lens 6c within a bore thereof, and the front lens 6c concentrates the Tx signal output from the Tx unit 3 and transmitting through the WDM filter 8a onto the end of the coupling fiber 4e. The front J-sleeve 6b is fixed to the front lens holder 6a by the piercing welding after adjusting an insertion depth of the front lens holder 6a into the bore 6d of the front J-sleeve 6b, which is the optical alignment along the optical axis. In this alignment, the end of the coupling fiber 4e is not always positioned just on a focal point of the front lens 6c. When the end of the coupling fiber 4e locates on the focal point of the front lens 6c, the Tx signal output from the Tx unit 3 may couple with the coupling fiber at a maximum efficiency. Such a condition sometimes causes an excess optical power in the external fiber. Accordingly, a de-focus tuning, where the end of the coupling fiber 4e is set in a position offset from the focal point of the front lens 6c by adjusting the insertion depiction of the front lens holder 6a into the bore 6d of the front J-sleeve 6b, may adjust the optical power within a specified range.

The optical alignment in a plane perpendicular to the optical axis may be carried out by sliding the coupling unit 4 on a surface 6e of the front J-sleeve 6b. After the optical alignment, the fillet welding may fix the coupling unit 4 to the front alignment unit 6.

The Tx unit 3 may be fixed to the primary assembly 5 by procedures similar to those for the Rx unit 2. The Tx unit 3 is fixed to the primary assembly 5 in a position opposite to the front alignment unit 6. The optical axis of the Tx unit 3 becomes substantially in parallel to the optical axis of the coupling unit 4. The Tx unit 3 provides a lens in an output port thereof that collimates the Tx signal output from the Tx unit 3. The optical module 1 of the present embodiment installs the optical coupling system processing collimated beams because the WDM filter 8a requires collimated beams to distinguish the beams depending on respective wavelengths. When two optical beams entering the WDM filter 8a have respective wavelength closely to each other, the incident angles of the optical beams are necessary to be within ±0.5° to distinguish the optical beams effectively.

The optical module 1 of the present embodiment implements the WDM filter 8a on the filter holder 8 that is inserted into the housing 7 from a side thereof. Also, the optical module 1, in order to precisely determine angles of the normal line of the WDM filter 8a with respect to the optical axes of the Rx unit 2 and the Tx unit 3, respectively, provides slopes 7b in the housing 7 and slopes 8b in the filter holder 8. Referring to FIGS. 2 and 3, the housing 7 provides a bore (Tx bore) 7a whose axis substantially in parallel to the optical axis of the coupling unit 4 and another bore (Rx port) into which the filter holder 8 is inserted. Also, the filter holder 8 provides a bore (Tx bore) 8e and another bore (Rx bore) 8*d*, where the Tx bore 8*e* connects to the Tx bore 7*a* of the housing 7, while, the Rx bore 8*d* connects to the Rx bore 7*c* of the housing 7. Inserting the filter holder 8 into the Rx bore 7*c* of the housing 7, and mating the slopes 8*b* of the filter holder 8 with the slopes 7*b* of the housing without forming any gaps therebetween; the filter holder 8 is automatically aligned with the housing 7. Also, the Tx bore 8*e* and the Rx bore 8*d* expose on the mounting surface 8*c*, that is, the axis of the Tx bore 8*e* intersects with the axis of the Rx bore 8*d* at the surface of the WDM filter 8*a* mounted on the mounting surface 8*c*. Moreover, the mounting surface 8*a* of the filter holder 8, where the WDM filter 8*a* is mounted, is mechanically aligned with the slopes 8*b*, the angle of the WDM filter 8*a* with respect to the optical axis of the Rx unit 2 and that of the Tx unit 3 may be automatically determined That is, the normal line of the WDM filter 8*a* automatically makes an angle of 45° with respect to the optical axis of the Rx unit 2 and to the Tx unit 3.

Next, practical procedures of the optical alignment of the optical module 1 will be described.

First step inserts the filter holder 8, which secures the WDM filter 8*a* in the top thereof, into a side bore of the housing 7. Because the filter holder 8 provides the slopes 8*b* and the housing 7 also provides the slopes 7*b*, both members, 7 and 8, may be automatically aligned by setting the slopes 8*b* of the filter holder 8 within the slopes 7*b* of the housing 7. The laser welding may fix the filter holder 8 with the WDM filter 8 to the housing 7.

Second step fixes the Tx unit 3 to the housing 7. Specifically, the Tx unit 3 is fixed to a surface, which is opposite to the surface to which the front alignment unit 6 is fixed, by the fillet welding. The process does not perform the optical alignment between the Tx unit 3 and the housing 7; that is, the Tx unit 3 is fixed to a designed position of the housing 7.

The third step fixes the coupling unit 4 to the housing 7 through the front alignment unit 6. Specifically, the procedure prepares a dummy fiber that interlock with the front lens holder 6*a* and has an end surface positioning substantially on the focal point of the front lens 6*c*. Sliding the front lens holder 6*a* on the surface of the housing 7 as sensing the Tx signal practically output from the Tx unit 3, the process fixes the front lens holder 6*a* at a position at which the Tx signal sensed through the dummy fiber becomes a maximum.

Then, removing the dummy fiber and covering the front lens holder 6*a* by the front J-sleeve 6*b*, the coupling unit 4 is temporally aligned at a position in the plane perpendicular to the optical axis by sliding the coupling unit 4 on the surface 6*e* of the front J-sleeve 6*b* where the maximum optical power of the Tx signal detected through the coupling unit 4 becomes a maximum. The insertion depth of the front lens holder 6*a* into the front J-sleeve 6*b* is adjusted at this point. Practically activating the LD in the Tx unit 3, the insertion depth may be determined at a position where the optical power sensed through the coupling fiber 4*e* becomes in a preset range, and the front J-sleeve 6*b* is fixed to the front lens holder 6*a* by the piercing welding. The optical alignment between the front lens holder 6*a* and the front J-sleeve 6*b* is not always set in the position where the end of the coupling fiber 4*e* is aligned with the focal point of the front lens 4*c*; because, when the end of the coupling fiber 4*e* is in the focal point of the front lens 6*c*, the optical power output from the coupling fiber 4*e* sometimes exceeds the eye-safety range. Accordingly, the end of the coupling fiber 4*e* is usually set in a de-focused point of the front lens 6*c*. Finally, the alignment of the coupling unit 4 in the plane perpendicular to the optical axis is precisely performed by sliding the coupling unit 4 on the end surface 6*e* of the front J-sleeve 6*b*. The coupling unit 4 is fixed to the front J-sleeve 6*b* at thus determined position by the fillet welding.

The fourth step aligns the Rx unit 2 to the housing 7, exactly the filter holder 8*m* and fixes thereto. Specifically, the process first fixes the rear lens holder 9*a* to the end surface of the filter holder 8 without performing any alignment. That is, the rear lens holder 9*a* is fixed in the designed position of the filter holder 8 by the fillet welding. Then, the insertion depth of the front lens holder 9*a* into the bore 9*d* of the rear J-sleeve 9*b* is first adjusted. Interlocking the Rx unit 2 with the rear J-sleeve 9*b*, and providing a dummy Rx signal from the coupling unit 4, the optical alignment of the Rx unit 2 with the rear J-sleeve 9*b* may be carried out by practically detecting the Rx signal by the PD 2*a* in the Rx unit 2. Because the WDM filter 8*a* is aligned in the angle thereof, the dummy Rx beam enters the Rx unit 2 without performing the optical alignment of the Rx unit 2 in the plane perpendicular to the optical axis. Or, the dummy Rx signal enters the PD 2*a* in the Rx unit 2 with optical power by which at least the optical alignment along the optical axis enables. The insertion depth of the rear lens holder 9*a* is set at the position where the optical power sensed by the PD 2*a* becomes a maximum, and the rear J-sleeve 9*b* is fixed to the rear lens holder 9*a* by the piercing welding. Subsequently, the optical alignment in the plane perpendicular to the optical axis is performed. As described, the outer diameter of the cap 2*e* of the Rx unit 2 is slightly smaller than the diameter of the bore 9*d* of the rear J-sleeve 9*b*, which forms a gap therebetween. The optical alignment is performed within this gap, and the Rx unit 2 is fixed to the rear J-sleeve 9*b* at the position where the optical power detected by the PD 2*a* becomes a maximum by the fillet welding. Thus, the process to assembly the optical module 1 is completed.

The optical alignment of the Rx unit 2 in the plane perpendicular to the optical axis does not rotate the Rx unit 2, because the Rx unit 2 provides lead terminals 2*b* that is to be fixed to respective pads on the circuit board. When the Rx unit 2 rotates in the optical alignment thereof, the positional relations between the lead terminals 2*b* and the pads are disordered. Also, when an Rx unit provides, instead of the window 2*f*, a lens to concentrate an Rx signal on the PD mounted on the stem, the optical alignment in the plane perpendicular to the optical axis is sometimes performed by rotating the stem 2*c*. However, the Rx unit 2 of the present embodiment, as described above, the rotation of the stem 2*c* is prohibited. Accordingly, the optical alignment in the plane perpendicular to the optical axis is done by forming a gap between the cap 2*e* and the bore 9*d* of the rear J-sleeve 9*b*. In such a case, the fillet welding for the Rx unit 2 to the rear J-sleeve 9*b* possibly inclines the Rx unit 2 with respect to the housing 7. Because the fillet welding, or the welding, locally melts the members to be welded, then solidifies the melted members to fix them; the members to be welded, namely, the rear J-sleeve 9*b* and/or the flange 2*g* of the cap 2*e* possibly deviate one aligned positional relation during the melting. Accordingly, the Rx unit 2, which is once aligned in the end 2*h* of the flange 2*g* thereof with respect to the end surface 9*e* of the rear J-sleeve 9*b*, which possibly makes the optical axis of the Rx unit 2 inclined with respect to the axis of the rear J-sleeve 9*b*. Even in such a case, the Rx signal coming from the housing 7 and entering the Rx unit 2 does not miss the optically sensitive surface of the PD 2*a*.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. An optical module, comprising:
   an optical unit enclosing a semiconductor optical device that has an optically sensitive surface, the semiconductor optical device converting one of an optical signal and an electrical signal into another of the optical signal and the electrical signal, the optical unit having an optical axis;
   a coupling unit that receives an external optical fiber therein, the coupling unit having an optical axis and being fixed to a primary assembly, the optical axis of the coupling unit being perpendicular to the optical axis of the optical unit, and
   the primary assembly having a rear alignment unit that includes a rear lens holder, a rear joint sleeve, and a filter holder, the rear lens holder having a cylindrical shape with a bore that secures a rear lens therein, the rear joint sleeve having a cylindrical shape with a bore that receives the rear lens holder therein, the rear joint sleeve having an end surface to which the optical unit is fixed, the filter holder securing a wavelength division multiplexing (WDM) filter therein that has a normal line making a half right angle with respect to the optical axis of the coupling unit and the optical axis of the optical unit,
   wherein the optically sensitive surface of the semiconductor optical device is aligned in a level thereof with the end surface of the primary assembly, and
   wherein the end surface of the joint sleeve of the primary assembly extends in parallel to the optical axis of the coupling unit.

2. The optical module of claim 1,
   wherein the optical unit is a receiver optical unit that encloses a semiconductor photodiode (PD) having the optically sensitive surface for receiving an optical signal entering the optical module provided from the external optical fiber.

3. The optical module of claim 1,
   wherein the optical unit is a transmitter optical unit that encloses a semiconductor laser diode (LD) having the optically sensitive surface from which an optical signal is emitted to the external optical fiber.

4. The optical module of claim 1,
   wherein the optical unit is fixed to the primary assembly by fillet welding.

5. The optical module of claim 1,
   wherein the rear joint sleeve is fixed to the rear lens holder by piercing welding.

6. The optical module of claim 1,
   wherein the optical unit provides a cap that encloses the semiconductor optical device therein, the cap having a flange that is welded to the end surface of the rear joint sleeve.

7. The optical module of claim 1,
   wherein the filter holder has a mounting surface, a Tx bore, and an Rx bore, the Tx bore having an axis extending in parallel to the optical axis of the coupling unit, the Rx bore having an axis extending in parallel to the optical axis of the optical unit, the Tx bore and the Rx bore each exposing on the mounting slope, the mounting slope mounting the WDM filter such that the axis of the Tx bore intersects the axis of the Rx bore at a surface of the WDM filter, and
   wherein the rear lens holder is fixed to the filter holder.

8. The optical module of claim 1,
   further including a front alignment unit that provides a front lens holder and a front joint sleeve, the front lens holder having a cylindrical shape with a bore that secures a front lens therein, the front joint sleeve having an end surface and a cylindrical shape with a bore that receives the front lens holder therein, the end surface of the front joint sleeve fixing the coupling unit thereto.

9. The optical module of claim 1,
   Further including another optical unit that converts one of an optical signal and an electrical signal into another of the optical signal and the electrical signal, the optical unit enclosing a semiconductor optical device having an optically sensitive surface,
   Wherein the another optical unit has an optical axis extending in parallel to the optical axis of the coupling unit and in perpendicular to the optical axis of the optical unit.

10. The optical module of claim 9,
    wherein the optical unit is a receiver optical unit that encloses a semiconductor photodiode (PD) having the optically sensitive surface for receiving an optical signal entering the optical module provided from an external optical fiber and reflected by the WDM filter, and the another optical unit is a transmitter optical unit that encloses a semiconductor laser diode (LD) having the optically sensitive surface from which another optical signal is emitted to the external optical fiber passing through the WDM filter.

11. An optical module, comprising:
    a coupling unit that receives an external optical fiber, the coupling unit having an optical axis aligned with the external optical fiber;
    a primary assembly including a housing and a filter holder, the filter holder being inserted within the housing and securing a wavelength division multiplexing (WDM) filter in a top thereof; and
    an optical unit that encloses a semiconductor optical device, the semiconductor optical device having an optically sensitive surface and an optical axis that makes a substantially right angle against the optical axis of the coupling unit, the semiconductor optical device optically coupling with the external optical fiber through the WDM filter,
    wherein the optically sensitive surface of the semiconductor optical device is aligned in a level thereof with the end surface of the primary assembly, and
    wherein the housing of the primary assembly provides slopes and the filter holder provides slopes mating with the slopes of the housing thereby the WDM filter making a half right angle with respect to the optical axis of the coupling unit and the optical axis of the optical unit.

12. The optical module of claim 11,
    wherein the slopes in the housing and the slopes in the filter holder mating with the slopes of the housing are arranged along the optical axis of the coupling unit.

* * * * *